(12) United States Patent
Yan et al.

(10) Patent No.: US 7,194,162 B2
(45) Date of Patent: Mar. 20, 2007

(54) FILTER RESPONSE OPTIMIZATION FOR AN ARRAYED WAVEGUIDE GRATING DEVICE BY ADJUSTING GRATING OPTICAL PATH LENGTH AT NANOMETER SCALE

(75) Inventors: Ming Yan, Pleasanton, CA (US); Liang Zhao, San Jose, CA (US); Hao Xu, Sunnyvale, CA (US)

(73) Assignee: NeoPhotonics Corporation, San Jose, CA (US)

( * ) Notice: Subject to any disclaimer, the term of this patent is extended or adjusted under 35 U.S.C. 154(b) by 207 days.

(21) Appl. No.: 10/082,603

(22) Filed: Feb. 22, 2002

(65) Prior Publication Data

US 2003/0161579 A1    Aug. 28, 2003

(51) Int. Cl.
*G02B 6/34* (2006.01)
*G02B 6/00* (2006.01)
(52) U.S. Cl. .......................................... 385/37; 385/31
(58) Field of Classification Search .................. 385/37, 385/14, 46, 129
See application file for complete search history.

(56) References Cited

U.S. PATENT DOCUMENTS

| 4,978,188 | A | 12/1990 | Kawachi | 350/96.12 |
|---|---|---|---|---|
| 5,259,061 | A | 11/1993 | Burns | 385/132 |
| 5,652,819 | A | 7/1997 | Orazi | 385/51 |
| 5,675,674 | A | 10/1997 | Weis | 385/12 |
| 5,699,468 | A | 12/1997 | Farries | 385/140 |
| 5,712,715 | A | 1/1998 | Erdogan | 359/8 |
| 5,719,974 | A | 2/1998 | Kashyap | 385/1 |
| 5,830,622 | A | 11/1998 | Canning | 430/321 |
| 5,832,154 | A | 11/1998 | Uetsuka | 385/37 |
| 5,848,207 | A | 12/1998 | Uetsuka | 385/37 |
| 5,898,804 | A | 4/1999 | Wickham | 385/37 |
| 5,940,548 | A * | 8/1999 | Yamada et al. | 385/14 |
| 5,982,963 | A | 11/1999 | Feng | 385/37 |
| 6,016,374 | A | 1/2000 | Adams | 385/24 |
| 6,021,248 | A | 2/2000 | Cornish | 385/147 |
| 6,141,469 | A | 10/2000 | Kashyap | 385/27 |
| 6,236,782 | B1 | 5/2001 | Kewitsch | 385/43 |
| 6,243,517 | B1 | 6/2001 | Deacon | 385/50 |
| 6,356,681 | B1 * | 3/2002 | Chen et al. | 385/37 |
| 6,442,311 | B1 * | 8/2002 | Barbarossa et al. | 385/37 |
| 2001/0051018 | A1 * | 12/2001 | Arai et al. | 385/24 |
| 2003/0035640 | A1 * | 2/2003 | Dugan et al. | 385/124 |

* cited by examiner

*Primary Examiner*—Sung Pak
(74) *Attorney, Agent, or Firm*—Dardi & Associates, PLLC; Peter S. Dardi

(57) ABSTRACT

A method of optimizing a filter response of an arrayed waveguide grating is disclosed. The method includes the step of measuring a respective phase error of a plurality of waveguide cores of the arrayed waveguide grating. Once the phase error is measured, a respective optical path length of the cores is adjusted in accordance with the respective phase error of the cores. Optical path length is adjusted by adjusting a respective refractive index of the cores. The respective optical path length can be controlled to nanometer accuracies by adjusting the respective refractive index of the cores.

20 Claims, 5 Drawing Sheets

FILTER RESPONSE OPTIMIZATION FOR AN ARRAYED WAVEGUIDE GRATING DEVICE BY ADJUSTING GRATING OPTICAL PATH LENGTH AT NANOMETER SCALE

FIELD OF THE INVENTION

The present invention relates generally to the fabrication and optimization of optical waveguide based planar lightwave circuits in the area of filter design and the process for realization such design. More particularly, the present invention relates to a method and system for design and adjusting the filter response of arrayed waveguide grating type planar lightwave circuits for dense wavelength division multiplexing (DWDM) applications.

BACKGROUND OF THE INVENTION

Planar lightwave circuits comprise fundamental building blocks for the newly emerging, modern fiberoptic communications infrastructure. Planar lightwave circuits are innovative devices configured to transmit light in a manner analogous to the transmission of electrical currents in printed circuit boards and integrated circuit devices. Examples include arrayed waveguide grating devices, integrated wavelength multiplexers/demultiplexers, optical switches, optical modulators, wavelength-independent optical couplers, and the like.

Planar lightwave circuits (PLCs) generally involve the provisioning of a series of embedded optical waveguides upon a semiconductor substrate (e.g., silicon), with the optical waveguides fabricated from one or more silica glass layers, formed on an underlying semiconductor substrate. PLCs are constructed with a number of waveguides precisely fabricated and laid out across a silicon wafer. A conventional optical waveguide comprises an un-doped silica bottom clad layer, with at least one waveguide core formed thereon, and a cladding layer covering the waveguide core, wherein a certain amount of at least one dopant is added to both the waveguide core and the cladding layer so that the refractive index of the waveguide core is higher than that of the cladding layer.

Prior art FIG. 1 shows a cross-section view of a conventional planar optical waveguide. As depicted in FIG. 1, the planar optical waveguide includes a doped $SiO_2$ glass core 10 formed over a $SiO_2$ bottom cladding layer 12 which is on a silicon substrate 13. A $SiO_2$ top cladding layer 11 covers both the core 10 and the bottom cladding layer 12. As described above, the refractive index of the core 10 is higher than that of the cladding layers 11 and 12.

Consequently, optical signals are confined axially within core 10 and propagate lengthwise through core 10. The $SiO_2$ glass core 10 is typically doped with Ge or P to increase its refractive index. In many types of PLC devices, a large number of cores (e.g., 40 or more) are used to implement complex fiber-optic functions, such as, for example, arrayed waveguide grating multichannel multiplexers and de-multiplexers.

Effective refractive index, which is comprised of core and clad refractive index, control is very critical to the planar lightwave circuit devices. For example, the center wavelength of each channel in an arrayed waveguide grating (AWG) device is directly affected by the refractive index of the core. A deviation of refractive index within 0.0001 will cause the channel center wavelength to vary in the region of 0.1 nm. For a 40 channel AWG operating in the C band (1520 nm~1565 nm), the channel to channel spacing is only 0.8 nm. Therefore, the effective refractive index has to be accurate to about 0.0003 across the substrate to provide a high quality AWG device.

In addition to effective refractive index control, the performance of AWG devices is critically dependent upon the precise control of the physical path length of each of the comprising waveguides. The physical path length is determined by the resolution of fabrication process, such as photolithography technique. The product of effective refractive index and physical dimension "l" is the optical path length. The optical path length comprises the dominant influence in the performance of an arrayed waveguide grating (AWG) device. The optical function of AWG is categorized as a finite impulse response (FIR) filter. It's optical performance is determined by the amplitude and optical path length of multiple paths. The transfer function of the AWG can be expressed by the amplitude $a_k$ and the optical pathlength $L_k$ of the k arrayed waveguide and is shown as $$H(\lambda)=\Sigma a_k * \exp(-2\pi L_k/\lambda)$$

where H is the transfer function and $\lambda$ is wavelength of light. The optical spectrum response of the filter, i.e., insertion loss, is a complex conjugate of the transfer function:

$$IL(\lambda)=-20*\log(|H(\lambda)|^2)=-20*\log(|\Sigma a_k* \exp(-2\pi L_k/\lambda)|^2)$$

In addition to the amplitude response of the AWG filter, often referred to as the insertion loss spectrum, the phase response of the transfer function also contributes to the dispersion aspect of the filter function. More specifically, the group delay of the filter is the derivative of the phase response as a function of the wave vector:

$$\Phi(\lambda)=Im(H(\lambda))$$

where "Im" is the operator of imagery function and "$\Phi(\lambda)$" is the phase response of the AWG filter.

Using conventional fabrication processes, core refractive index control is limited to about plus or minus 0.0001. Optical path length control (e.g., the length of the particular waveguides) is similarly limited by the performance of fabrication process to about plus or minus 0.01 microns. These fabrication limitations limit the amount of channel isolation that of can be obtained in a dense wavelength division multiplexing (DWDM) application, and thus limit the number of channels that can be implemented.

Thus, what is required is a solution that improves core refractive index control of complex PLC devices incorporating multiple waveguide cores. What is required is a solution that improves optical path length control of complex PLC devices incorporating multiple waveguide cores. What is further required is a solution that precisely optimizes channel isolation of AWG devices. The present invention provides a novel solution to these requirements.

SUMMARY OF THE INVENTION

The present invention provides a solution that improves core refractive index control of complex PLC devices incorporating multiple waveguide cores. The present invention provides a solution that improves optical path length control of complex PLC devices incorporating multiple waveguide cores. Additionally, the present invention precisely optimizes channel isolation of AWG devices.

In one embodiment, the present invention is implemented as a fabrication process for optimizing a filter response of an AWG. The process includes the step of measuring a respective optical path length, i.e., the product of the refraction index and the physical length of waveguide, of a plurality of waveguide cores of the AWG. For DWDM applications, an optical filter such as an AWG requires greater than 20 dB isolation between each individual wavelength channel. Therefore, the optical path lengths of the individual waveguides of an AWG need to be accurate to within a few nanometers. In one embodiment, an optical path length characterization tool having a resolution of a few nanometers is implemented by use of a low coherence interferometer.

Once the optical pathlength is measured, a respective optical path length of the cores is adjusted in accordance with the respective phase error of the cores. Adjusting a respective refractive index of the cores is used to adjust optical path length. By adjusting refractive index, the optical path length can be controlled to nanometer accuracies. The adjustment of the optical path length thereby optimizes a filter response of the AWG. The respective phase error can be measured using a low coherent optical interferometer to within nanometer resolution. The respective refractive index is adjusted by using laser energy on the cores. The laser energy can be ultraviolet laser energy applied to the grating area of the cores. The adjusting of the refractive index of the cores can be used to equalize channel power of the AWG. Similarly, the adjusting of the refractive index of the cores can be used to compensate for dispersion within the AWG.

In this manner, the present invention provides for very precise control of the core refractive index of each waveguide comprising the AWG. This precise control of the core refractive index thus provides very precise control of the optical path length of each waveguide comprising the AWG. The precise control of these factors enable embodiments of the present invention to precisely optimize channel isolation of AWG devices.

BRIEF DESCRIPTION OF THE DRAWINGS

The present invention is illustrated by way of example and not by way of limitation, in the Figures of the accompanying drawings and in which like reference numerals refer to similar elements and in which.

Prior art

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth in order to provide a thorough understanding of the present invention. However, it will be obvious to one of ordinary skill in the art that the present invention may be practiced without these specific details. In other instances, well known methods, procedures, components, and circuits have not been described in detail as not to obscure aspects of the present invention unnecessarily.

Embodiments of the present invention are directed towards providing a solution that improves core refractive index control of complex PLC devices incorporating multiple waveguide cores. The present invention provides a solution that improves optical path length control of complex PLC devices incorporating multiple waveguide cores. Additionally, the present invention precisely optimizes channel isolation of AWG devices. The present invention and its benefits are further described below.

Figure 1:
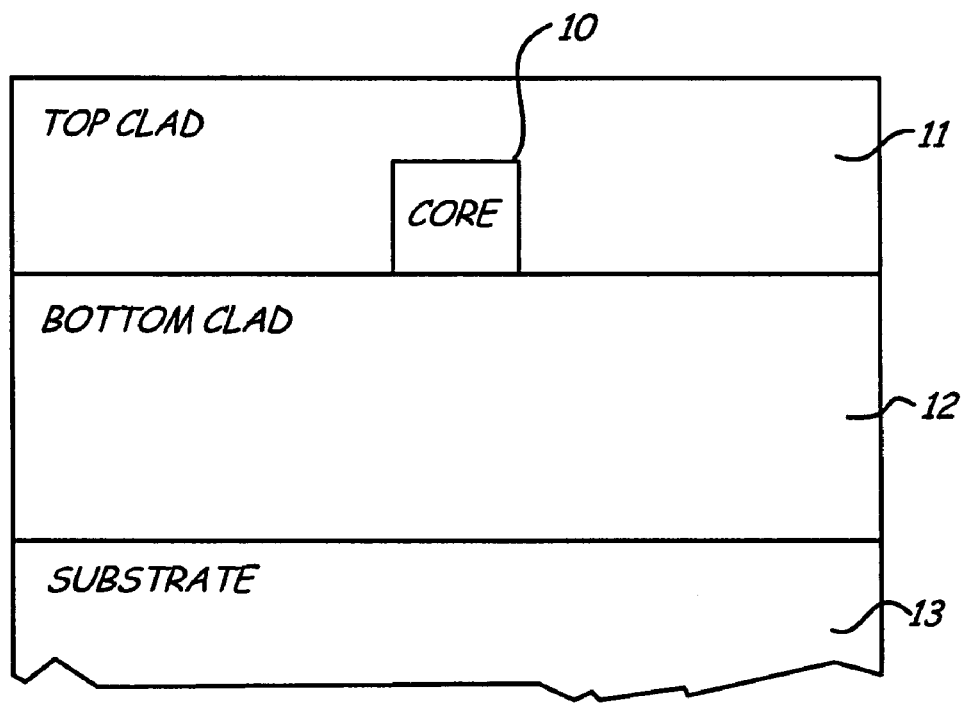
FIG. 1 shows a cross-section view of a conventional planar optical waveguide fabricated using a silica glass substrate.
Figure 2:
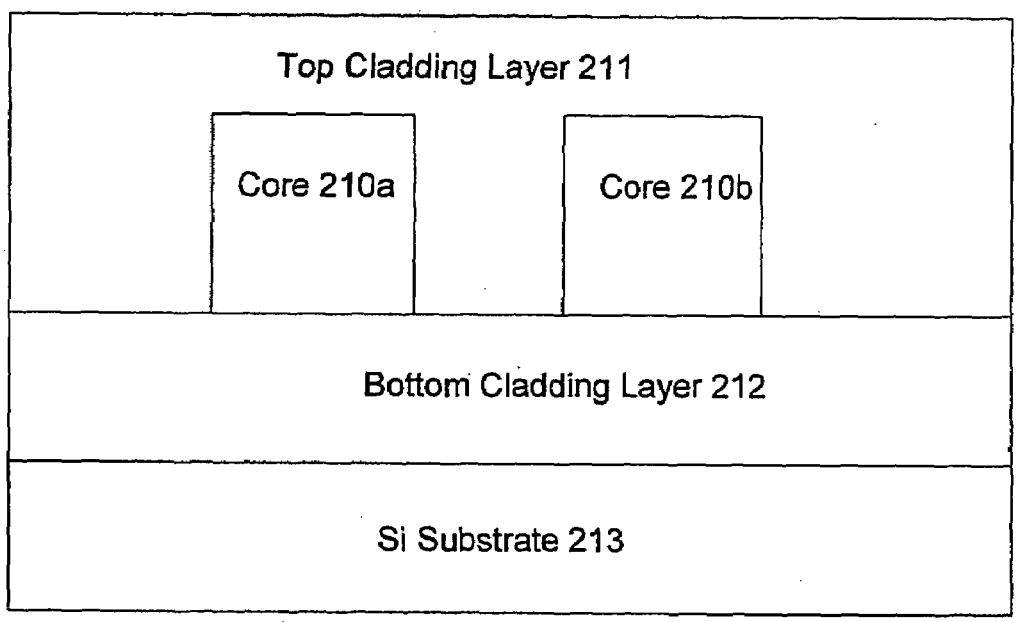
FIG. 2 shows a cross-section view showing two cores of an optical waveguide structure fabricated in accordance with one embodiment of the present invention.

FIG. 2 shows a cross-section view of an optical waveguide structure 200 in accordance with one embodiment of the present invention. As depicted in FIG. 2, optical waveguide structure 200 is shown in a state subsequent to etching to remove a core layer used to form cores 210a and 210b. Cores 210a–b comprise doped $SiO_2$ glass cores formed over a $SiO_2$ bottom cladding layer 212 which is on a silicon substrate 213. It should be noted that while the optical waveguide structure 200 shows only two cores, a planar lightwave circuit including the optical waveguide structure 200 can incorporate 40 or more such waveguide cores, as a case where waveguide structure 200 depicts a portion of an AWG device.

It should be noted that the major steps of polysilicon deposition, photolithography, and fabrication are well known and widely used in planar lightwave circuit fabrication. Accordingly, such steps will not be described in extensive detail. Additionally, although the present invention is described in the context of an AWG device, it should be noted that aspects of the present invention are well suited for use with other types of PLC devices incorporating multiple waveguide cores.

Referring still FIG. 2, an optical core layer is formed on a bottom clad 212, wherein the optical core layer has a higher refractive index than bottom clad 212. Bottom clad 212 can be a silicon dioxide layer formed over a silicon substrate 213. The optical core layer can be a doped $SiO_2$ glass layer, as is known in the art. A mask (not shown) is then formed over the optical core layer using well-known photolithography techniques. The unmasked areas of the optical core layer are then etched to define the cores 210a–b, wherein the etching removes the unmasked area of the optical core layer (e.g., the layer from which cores 210a–b were formed). The etching defines the dimensions of optical cores 210a–b, as shown in FIG. 2. The mask is subsequently removed from the optical core, such that the optical waveguide structure 200 appears as shown in FIG. 2.

AWG devices and active PLC devices are highly dependent upon the precise fabrication of numerous closely spaced waveguide cores such as cores 210a–b. It is critical that the length and refractive index of cores 210a–b are precisely controlled. The present invention provides a fabrication process that precisely controls both the optical path length and the refractive index of cores 210a–b. In addition, the present invention is capable of precisely controlling optical attenuation present within cores 210a–b.

In accordance with one embodiment of the present invention, the fabrication process measures a respective phase error of a plurality of waveguide cores of the AWG. Phase errors of the individual waveguides are measured to nanometer resolution is measured using a modified low coherence interferometer. The interferometer functions by detecting the interferogram of an optical wave going through an individual waveguide in the AWG and a external reference optical path in the interferometer (e.g., a Mach-Zenhder interferometer). The reference optical path is varied in such a way that the interferogram of all of the individual waveguides of the AWG can be measured simultaneously. The interferogram is subsequently analyzed individually to obtain the amplitude and phase of optical wave going through each individual waveguide in the grating of the AWG.

Once the phase error, or optical pathlength error, is measured, a respective optical path length of the cores (e.g., cores 210a–b) is adjusted in accordance with the respective phase error of the cores. Optical path length is adjusted by adjusting a respective refractive index of the cores. The adjustment of the optical path length thereby optimizes a filter response of the AWG. As described above, the respective phase error can be measured using a low coherent optical interferometer to within nanometer resolution. The respective refractive index is adjusted by using laser energy on the cores. The laser energy can be ultraviolet laser energy applied to the grating area of the cores. Impinging laser energy changes the molecular structure of the silica matrix within the core (e.g., the molecular structure of the dopants within the silica matrix), thereby changing the refractive index.

Laser energy is applied to the cores 210a–b in a series of pulses (e.g., pulses at very high frequencies). By precisely controlling the number of pulses applied, the amount of laser energy applied can be precisely controlled, and thus, the degree of change in the refractive index can be precisely controlled. As is known by those skilled in the art, changing the refractive index of a waveguide effectively changes the optical path length of the waveguide. In this manner, the pulsed laser is capable of adjusting optical path length at nanometer scale increments.

In addition to changing the refractive index, the laser energy can be used to create small "occlusions" within the cores 210a–b (e.g., applying high-power to burn small "pits" within the cores). These occlusions cause attenuation of the light propagating through the cores 210a–b. By precisely controlling the number and degree of occlusions created within the cores, the power level of the light propagating through each of the cores can be precisely controlled.

The process of the present embodiment is well suited for use with the fabrication of AWG devices. For example, the optical filter in DWDM applications requires high channel isolation, which requires the optical path length in PLC devices to be accurate to within a few nanometers (e.g., less than 10 nm). Furthermore, devices such as an AWG have a certain fixed power distribution in the grating. The design of this power distribution is usually limited by the physical nature of waveguide device and is not necessarily optimized for high channel isolation. However, the optimization process can change the power level in each core, and thus optimize the power distribution for high channel isolation.

In other words, embodiments of the present invention utilize laser trimming to optimize the loss profile of the waveguides within an AWG.

Figure 3:
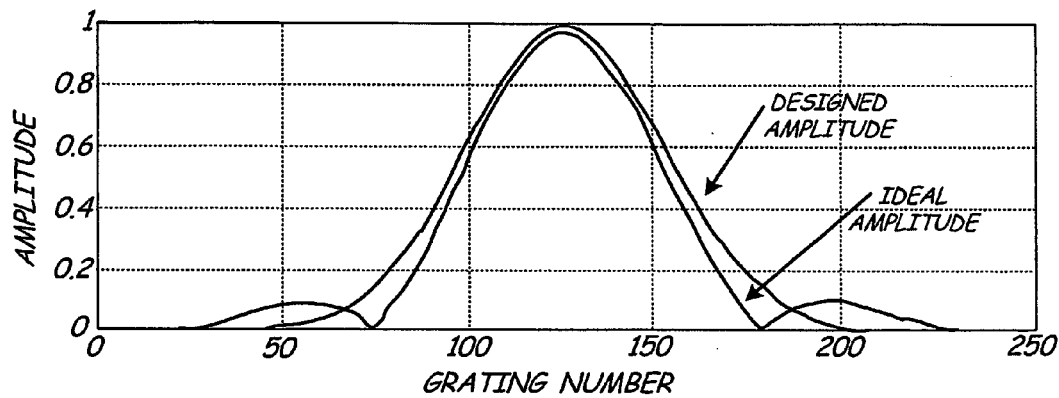
FIG. 3 shows a graph of a power distribution within a single channel of an AWG in accordance with one embodiment of the present invention.

FIG. 3 shows a graph of a power distribution within a single channel of an AWG in accordance with one embodiment of the present invention. The vertical axis of FIG. 3 shows amplitude (e.g., power) and the horizontal axis shows wavelength. FIG. 3 shows a designed amplitude in comparison to an ideal amplitude. The designed amplitude shows the channel isolation obtainable if the waveguide components (e.g., refractive index of the core, optical path length of the core, and the like) can be manufactured precisely to specification, given the limits of fabrication process. The ideal amplitude shows the channel isolation obtainable if the waveguide is adjusted to optimal condition using the process of the present invention.

Figure 4:
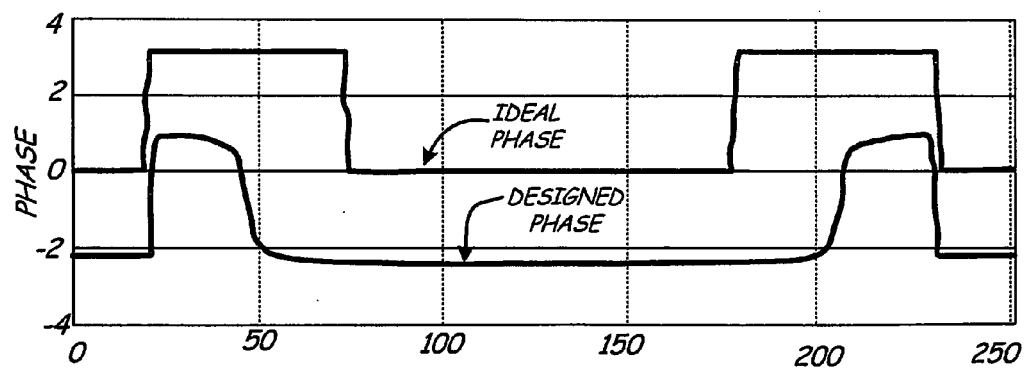
FIG. 4 shows a graph depicting an ideal phase of a signal in a first channel on the left-hand side and a second channel on the right inside in comparison to a designed phase.

FIG. 4 shows a graph depicting an ideal phase of a signal in a first channel on the left-hand side and a second channel on the right inside in comparison to a standard designed phase. The standard design of an AWG is based upon equal path length difference in the grating of the AWG. The difference of phase response of standard design of the AWG to the phase of ideal phase from a squared wavelength response can be adjusted through the uneven path length response utilizing the path length in the grating of AWG. In addition to the phase adjustment in the grating of the AWG, the amplitude of optical wave through individual waveguide needs to be adjusted accordingly. This amplitude control in the waveguide can be achieved by either lowering the coupling coefficient of individual grating waveguide to the slab lens in the AWG with waveguide width control. The additional control of amplitude or loss profile in the grating waveguide can be achieved by irradiation of individual waveguides with high intensity UV laser energy with the generation of local occlusions in the waveguide area, as described above. The combined effect of optical path length control and loss profile reshaping can be used to achieve ideal filter response of the PLC device.

It should be noted that the process of filter response adjustment comprises phase error measurement by low coherent optical interferometer having nanometer resolution, as described above. As described above, laser energy (e.g., ultraviolet laser energy) is subsequently used to irradiate specific waveguides in the AWG device to reshape the wavefront and to achieve optimized filter response at the output, such as flat top filter response of an AWG (e.g., shown in FIG. 6 below).

It should be noted that the design of an AWG in accordance with one embodiment of the present invention is optimized for laser trimming. For example, the waveguide cores of the AWG within the grating region can have specific areas which are optimize to receive the laser energy (e.g., adjustment areas) and thus have their refractive index altered. With such a device, the passband shape by itself without laser trimming would not necessarily be a flat-top design.

Additionally, it should be noted that the optimization process of the present invention can reshape of wavefront in PLC devices, and thus can tailor such devices for various DWDM network applications. For example, the built-in design of a chirp response in the grating area of an AWG in accordance with one embodiment of the present invention can provide a method for implementing dispersion compensation.

It should be noted that although UV laser trimming for waveguide devices has been practiced (e.g., "Beam-adjustment-free crosstalk reduction in 10 GHz-spaced arraywaveguide grating via photosensitivity under UV laser irradiation through metal mask" M. Takada et al Electronics Letter vol 36, No. 1 page 60 (2000), U.S. patent application Ser. No. 08/396,023 (Feb. 28, 1995) entitled "Radiolytic Modification of birefringence in silica planar waveguide structures" B. I. Greene et al.), these attempts do not address wavefront reshaping for optimized filter response using UV laser trimming.

Figure 5:
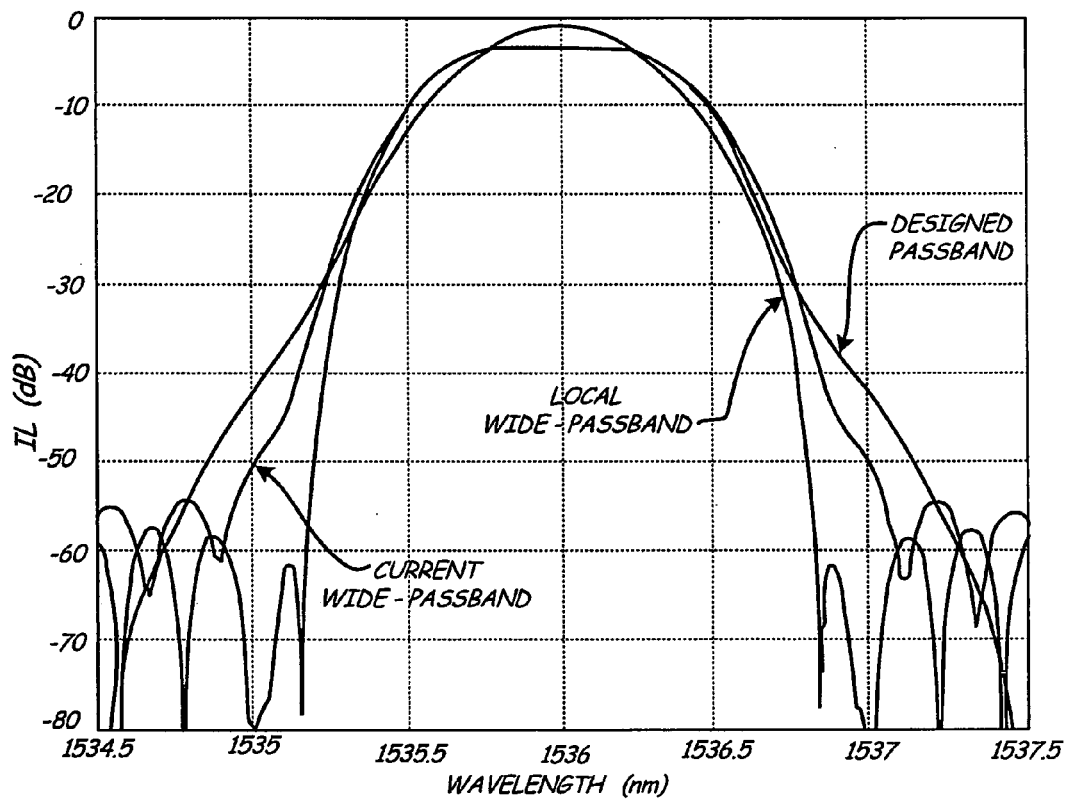
FIG. 5 shows a more detailed diagram of the power distribution within a single channel of an AWG.

FIG. 5 shows a diagram of the power distribution within a single channel of an AWG. FIG. 5 shows a designed passband (e.g., the best achievable channel isolation given the constraints of fabrication process). A current wide passband and an ideal wide passband are also shown. After PLC fabrication process, a post laser optimization process provides a additional modification on optical path length in the manner described above. The loss profile can be adjusted by irradiating the waveguides with high power to induce high optical loss by, for example, creating occlusions.

Figure 6:
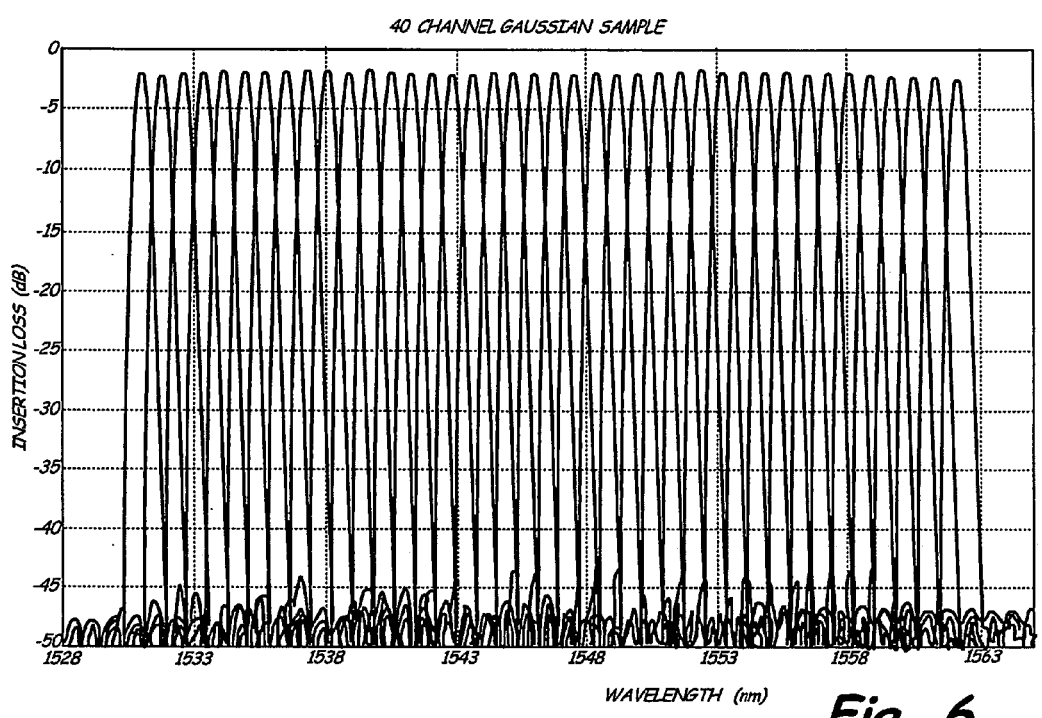
FIG. 6 shows a diagram of the spectral output of a high-performance AWG planar lightwave circuit having been fabricated with a method in accordance with the present invention.

FIG. 6 shows a diagram 600 of the spectral output of a high-performance AWG planar lightwave circuit having been fabricated with a method in accordance with one embodiment of the present invention. As depicted in FIG. 6, a 40 channel Gaussian sample of the output of an AWG device is graphed with respect to insertion loss on the vertical axis, and channel wavelength, on the horizontal axis. It should be noted that less than 0.8 nm wavelength separates the peaks of each channel. It should also be noted that the peaks of each channel are substantially constant in amplitude, from the lowest channel to the highest channel. Reliable performance of high-performance optical communications equipment is critically dependent upon equal channel spacing and equal channel amplitude to maintain high data rates (e.g., 10 Gbps or greater). The optimization process of the present invention thus increases device reliability and device performance.

Thus the present invention provides a solution that improves core refractive index control of complex PLC devices incorporating multiple waveguide cores. The present invention provides a solution that improves optical path length control of complex PLC devices incorporating multiple waveguide cores. Additionally, the present invention precisely optimizes channel isolation of AWG devices.

The foregoing descriptions of specific embodiments of the present invention have been presented for purposes of illustration and description. They are not intended to be exhaustive or to limit the invention to the precise forms disclosed, and obviously many modifications and variations are possible in light of the above teaching. The embodiments were chosen and described in order best to explain the principles of the invention and its practical application, thereby to enable others skilled in the art best to utilize the invention and various embodiments with various modifications as are suited to the particular use contemplated. It is intended that the scope of the invention be defined by the claims appended hereto and their equivalents.

What is claimed is:

1. A method of optimizing a filter response of an arrayed waveguide grating, the method comprising the steps of:
   a) measuring a respective phase error of a plurality of waveguide cores of an arrayed waveguide grating; and
   b) adjusting a respective optical path length of the cores in accordance with the respective phase error of the cores by adjusting a respective refracting index of the cores, wherein the optical path length is controlled to less than ten nanometers.

2. The method of claim 1 wherein the respective phase error is measured using a low coherent optical interferometer.

3. The method of claim 2 wherein the respective phase error is measured to within nanometer resolution.

4. The method of claim 1 wherein the respective refractive index is adjusted by using laser energy.

5. The method of claim 4 wherein the laser energy is ultraviolet laser energy.

6. The method of claim 1 wherein the adjusting of the refractive index of the cores is used to equalize channel power of the arrayed waveguide grating.

7. The method of claim 1 wherein the adjusting of the refractive index of the cores is used to compensate for dispersion within the arrayed waveguide grating.

8. The method of claim 1 wherein the refractive index of the cores is adjusted within a grating area of the arrayed waveguide grating by using laser energy.

9. A method for performing wavefront reshaping on an arrayed waveguide grating, the method comprising the steps of
   a) performing phase error measurement of a plurality of waveguide cores of an arrayed waveguide grating; and
   b) adjusting a respective optical path length of the cores in accordance with the phase error measurement by adjusting a respective refractive index of the cores, thereby performing wavefront reshaping on the arrayed waveguide grating, wherein the optical path length is controlled to less than ten nanometers.

10. The method of claim 9 wherein the phase error measurement is performed using a low coherent optical interferometer.

11. The method of claim 9 wherein the phase error measurement has a resolution of one nanometer or less.

12. The method of claim 9 wherein the respective refractive index is adjusted by using laser energy within a grating area of the arrayed waveguide grating.

13. The method of claim 12 wherein the laser energy is ultraviolet laser energy.

14. The method of claim 13 wherein the adjusting of the refractive index of the cores is used to equalize channel power of the arrayed waveguide grating.

15. The method of claim 9 wherein the adjusting of the refractive index of the cores is used to compensate for dispersion within the arrayed waveguide grating.

16. An arrayed waveguide grating having a optimized filter response, comprising a plurality of waveguide cores with a grating, wherein each core comprises an optical path length, and wherein the phase error of the filter corresponds with the optical path lengths of a plurality of cores differing less than ten nanometers relative to the target grating performance.

17. The arrayed waveguide grating of claim 16 wherein each of the optical path length adjustment regions are configured to receive ultraviolet laser energy.

18. A method of optimizing a filter response of an arrayed waveguide grating the method comprising the steps of:
   a) measuring a respective phase error of a plurality of waveguide cores of an arrayed waveguide grating; and
   b) adjusting a respective optical path length of the cores in accordance with the respective phase error of the cores by adjusting a respective refracting index of the cores, wherein the respective refractive index is adjusted using pulsed laser energy with, the number of pulses selected to yield a controlled adjustment of the optical path length to less than ten nanometers.

19. The method of claim 18 wherein the laser energy is ultraviolet laser energy.

20. The method of claim 18 wherein the adjusting of the refractive index of the cores is used to compensate for dispersion within the arrayed waveguide grating.

* * * * *

UNITED STATES PATENT AND TRADEMARK OFFICE
CERTIFICATE OF CORRECTION

PATENT NO. : 7,194,162 B2  Page 1 of 1
APPLICATION NO. : 10/082603
DATED : March 20, 2007
INVENTOR(S) : Ming Yan, Liang Zhao and Hao Xu It is certified that error appears in the above-identified patent and that said Letters Patent is hereby corrected as shown below:

Item [75], Inventors, after Liang Zhao, delete "San, Jose, CA" and insert --Sunnyvale, CA--.
Col. 1, Line 64, delete "interforueter" and insert --interferometer--.
Col. 2, Line 16, after "of" insert --:--.
Col. 2, Line 51, after "grating" insert --,--.

Signed and Sealed this

Thirteenth Day of May, 2008

JON W. DUDAS
*Director of the United States Patent and Trademark Office*